(12) United States Patent
Dunn et al.

(10) Patent No.: US 7,530,326 B2
(45) Date of Patent: May 12, 2009

(54) BLANKET ASSEMBLY FOR PET BED

(75) Inventors: Steven B. Dunn, Beverly Hills, CA (US); Mark Hatherill, Manhattan Beach, CA (US)

(73) Assignee: Munchkin, Inc., North Hills, CA (US)

( * ) Notice: Subject to any disclaimer, the term of this patent is extended or adjusted under 35 U.S.C. 154(b) by 277 days.

(21) Appl. No.: 11/141,951

(22) Filed: Jun. 1, 2005

(65) Prior Publication Data

US 2006/0272582 A1 Dec. 7, 2006

(51) Int. Cl.
*A01K 29/00* (2006.01)
(52) U.S. Cl. .................... 119/28.5; 119/169
(58) Field of Classification Search ............. 119/28.5, 119/169, 170, 171, 174; 5/482, 486, 498, 5/502, 500, 496, 484, 692; 24/382, 386, 24/383, 384; 2/270, 301
See application file for complete search history.

(56) References Cited

U.S. PATENT DOCUMENTS

| | | | |
|---|---|---|---|
| 3,902,456 A | | 9/1975 | David |
| 4,112,556 A | * | 9/1978 | Flaum et al. ............ 24/382 |
| 4,139,920 A | | 2/1979 | Evans |
| 4,169,428 A | | 10/1979 | Waugh |
| 4,513,461 A | * | 4/1985 | Tardivel ............... 5/413 R |
| D295,904 S | | 5/1988 | McMahon |
| 4,763,604 A | | 8/1988 | Meekins |
| 5,000,116 A | | 3/1991 | Fife et al. |
| 5,002,014 A | | 3/1991 | Albin |
| 5,144,911 A | * | 9/1992 | Moore et al. ........... 119/28.5 |
| 5,357,901 A | | 10/1994 | Batts |
| 5,749,314 A | | 5/1998 | Pelham et al. |
| 5,765,502 A | | 6/1998 | Haugh |
| 5,784,995 A | | 7/1998 | Willinger |
| 6,196,157 B1 | | 3/2001 | Northrop et al. |
| D441,146 S | | 4/2001 | Passmore |
| 6,698,380 B2 | | 3/2004 | Morrison |
| 2004/0134433 A1 | | 7/2004 | Holder |

FOREIGN PATENT DOCUMENTS

WO    WO 03/020163 A2    3/2003

* cited by examiner

*Primary Examiner*—Trinh T. Nguyen
(74) *Attorney, Agent, or Firm*—Knoble, Yoshida & Dunleavy, LLC (57) ABSTRACT

An improved pet bed assembly includes a water resistant outer cover defining an enclosed space and a removable blanket that is removably attached to the exterior of the outer cover. The removable blanket is preferably constructed so as to be completely removable from the outer cover for washing and replacement and is further preferably constructed so as to be reversible, with an attachment mechanism that permits it to be secured to the outer cover with either surface facing the pet. An inner bed assembly is positioned within the enclosed space that preferably includes a perimeter bolster portion and an interior cushion portion. The perimeter bolster cushion has a greater height than the interior cushion portion and its uncompressed state and is less compressible than the interior cushion. The interior cushion portion preferably includes a first cushioning material positioned within a first compartment that resists lateral displacement during use, which provides constant stable cushioning to the pet honorable conditions as well as a second laterally displaceable cushioning material within a second, upper compartment that permits the pet to burrow into and nest comfortably on the pet bed assembly.

15 Claims, 9 Drawing Sheets

BLANKET ASSEMBLY FOR PET BED

BACKGROUND OF THE INVENTION

1. Field of the Invention

This invention relates to the field of pet products, and particularly to beds for house pets such as dogs and cats.

2. Description of the Related Technology

Conventional pet bedding typically utilizes a simple polyester fiber filling which compresses over time and does not completely form to the shape of the animal. Products that are designed for orthopedic support typically contain a egg-crate style foam pad that, while it is resilient, does not completely and comfortably form to the shape of the animal. In nature, animal such as cats and dogs utilize natural materials to create their sleeping space. They use their paws and noses to move materials such as leaves and dirt into the most comfortable position for nesting.

It has also been observed that many pets also prefer to have an area at the edge of their sleeping area that is raised. This high edge gives them a feeling of safety and also creates a pillow on which they can rest their head and support their neck. While there are pet beds commercially available that provide such a raised edge, they are not constructed so as to satisfy the pet's inclination to move the padding material so as to create a more comfortable position for nesting.

It is important to frequently clean a pet bed. In fact, because a pet bed is prone to infestation by fleas, other parasites such as mites and pet dander, a strong case can be made that it is more important to clean a pet bed on a regular basis than it is to wash the bedding of a person. Conventional pet beds frequently feature a removable cover that can be removed from the rest of the pet bed for cleaning. However, such covers tend to be bulky and difficult to remove, wash, dry and reassemble onto the bed. Such beds do not provide the pet bed owner the option of washing just the portion of the pet bet that has been in contact with the animal. U.S. Pat. No. 5,144,911 to Moore et al. discloses a pet bed that has a mat that is removable for washing and that is releasably attached to the rest of the pet bed by means of a hook and loop style fastener. However, this mat is not reversible, meaning that only one surface can be arranged so it is in proximity to the pet.

A need exists for an improved pet bed assembly that satisfies the desire of pets such as cats and dogs to arrange the cushioning material of the pet bed into the most comfortable position for nesting. A need further exists for an improved pet bed assembly that has a soft surface on which the pet may rest that is easily removable for cleaning, replacement and that is reversible.

SUMMARY OF THE INVENTION

Accordingly, it is an object of the invention to provide an improved pet bed assembly that satisfies the desire of pets such as cats and dogs to arrange the cushioning material of the pet bed into the most comfortable position for nesting.

It is further an object of the invention to provide an improved pet bed assembly that has a soft surface on which the pet may rest that is easily removable for cleaning, replacement and that is reversible.

In order to achieve the above and other objects of the invention, a pet bed assembly according to a first aspect of the invention includes a resilient mattress having an upper surface; a removable blanket having a first side and a second, opposite side; and securing structure for securing the removable blanket to the resilient mattress in a location that is above the upper surface, the securing structure being constructed and arranged so as to permit the removable blanket to be secured to the resilient mattress in a first orientation wherein the first side of said removable blanket faces the upper surface or in a second orientation wherein the second side of the removable blanket faces the upper surface.

A pet bed assembly according to a second aspect of the invention includes a resilient mattress having an upper surface; a removable blanket having a first side and a second, opposite side; and zipper fastening structure for releasably securing the removable blanket to the resilient mattress in a position that is above the upper surface.

A modular blanket unit for a pet bed assembly according to a third aspect of the invention includes a blanket having a first side and a second, opposite side, the blanket further having an outer perimeter; a first row of zipper teeth mounted to the blanket near the outer perimeter; and a second row of zipper teeth mounted to the blanket near the outer perimeter.

A modular pet bed system according to a fourth aspect of the invention includes a resilient mattress having an upper surface; a first modular blanket unit having a first side and a second, opposite side; a second, replacement modular blanket unit having a first side and a second, opposite side; and securing structure for releasably securing one of the first and second modular blanket units to the resilient mattress assembly in a position that is above the upper surface.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
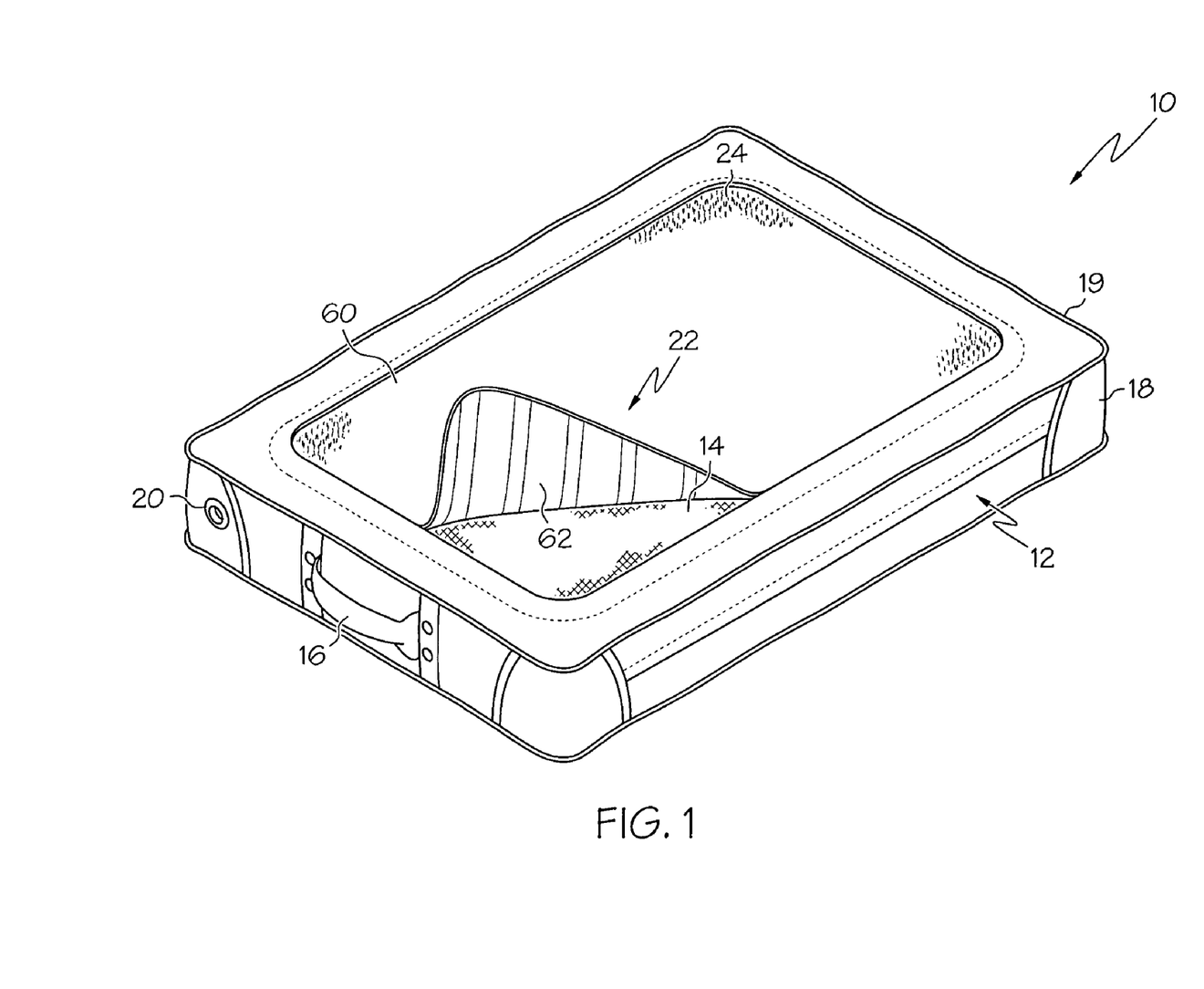
FIG. 1 is a perspective view of a pet bed assembly that is constructed according to a preferred embodiment of the invention.
Figure 5:
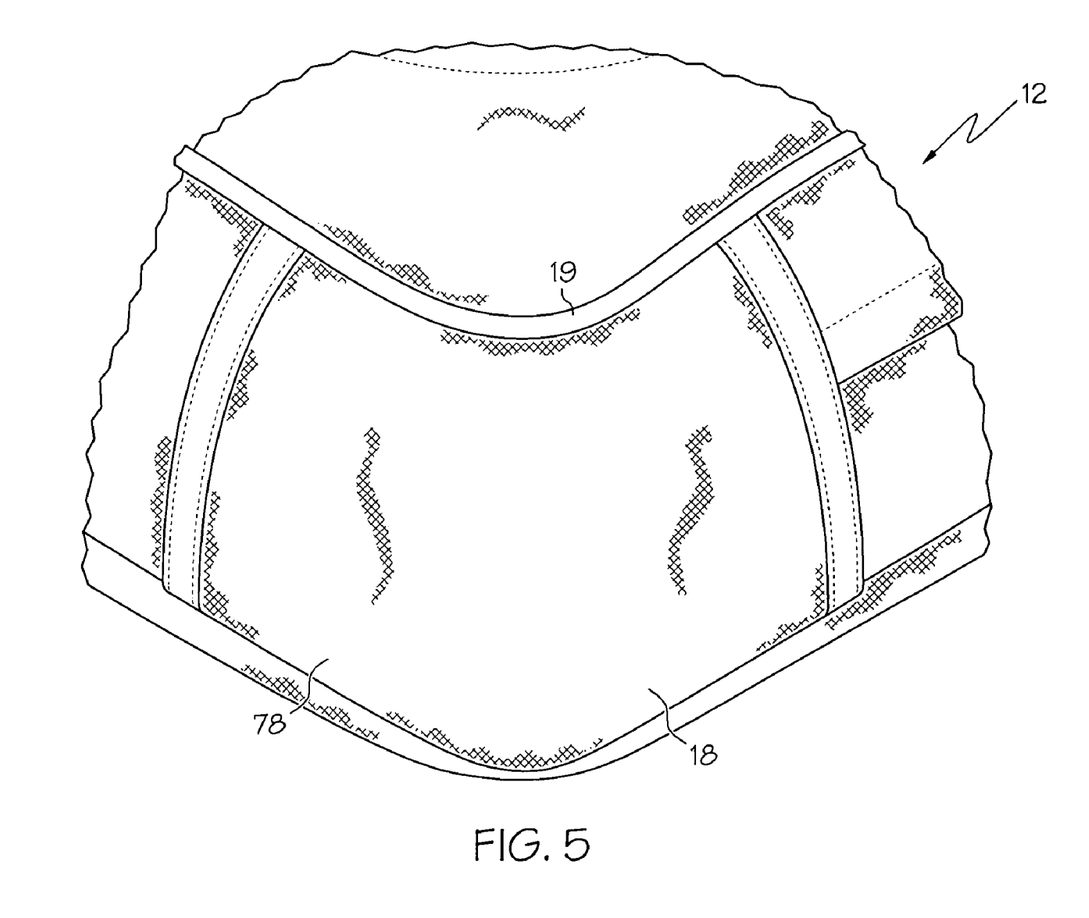
FIG. 5 is a fragmentary perspective view depicting another portion of the pet bed assembly.
Figure 6:
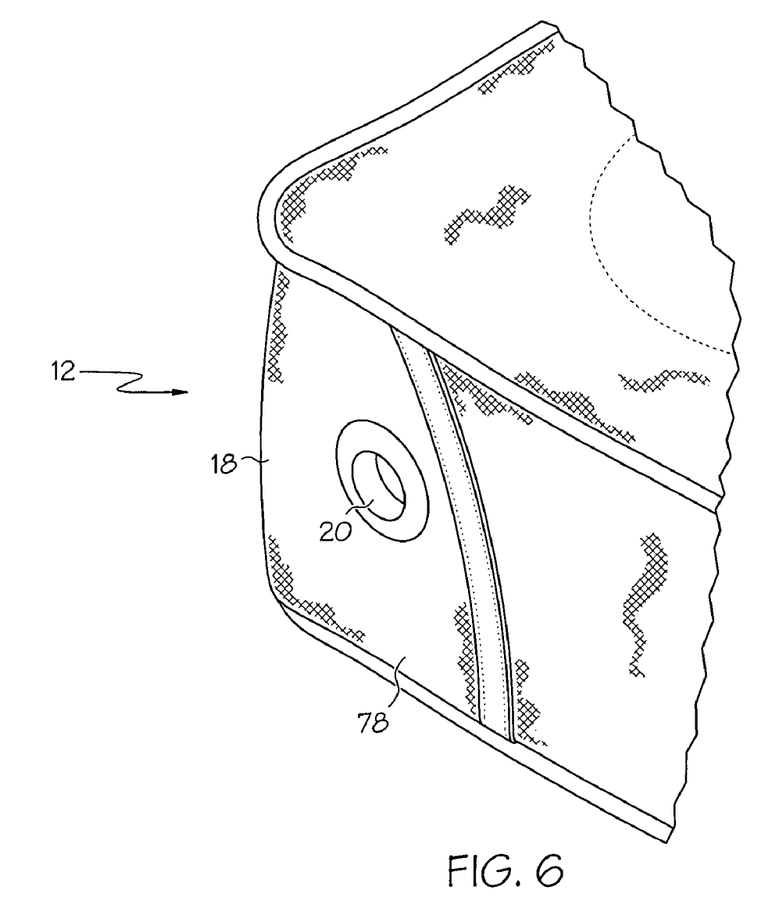
FIG. 6 is a fragmentary perspective view depicting yet another portion of the pet bed assembly.

Referring now to the drawings, wherein like reference numerals designate corresponding structure throughout the views, and referring in particular to FIG. 1, a pet bed assembly 10 that is constructed according to a preferred embodiment of the invention includes an outer cover 12 that defines an enclosed space and that has a upper surface 14 that is fabricated from a water resistant material. For the purposes of this document, the phrase "water resistant" is intended to be generic to materials that are water resistant as well as those materials that are waterproof. In the preferred embodiment, the water resistant material is a waterproof polynylon blend fabric having a polyurethane backing. Outer cover 12 is further provided with a handle 16 to enable convenient portability and handling of the pet bed assembly 10 by a consumer. Preferably, the entire outer cover 12 is constructed of a water resistant material, and more preferably a waterproof material. It includes reinforced corners 18 which are best depicted in FIGS. 5 and 6. Reinforced corners 18 preferably include an additional outer layer of reinforced flexible material 78, which provides enhanced wear resistance to the outer cover 12. For purposes that will be presently described, a power cord opening 20 is defined in one of the reinforced corners 18 to permit passage of an electrical cord. Power cord opening 20 is preferably sized with the diameter that is sufficient to enable a standard plug 21 of a power cord to be passed therethrough.

Pet bed assembly 10 further includes a removable blanket 22 that is mounted externally to the outer cover 12 in a position that is above the water resistant upper surface 14. Removable blanket 22 has a first side 60 and a second, opposite side 62, and is preferably fabricated from a soft washable material. The first side 60 of the removable blanket 22 preferably has a winter or pile surface that is piled and plush and will impart a feeling of warmth to an animal. The second side 62 of the removable blanket 22 is preferably textured as a summer surface of a smooth, tightly woven fabric that is not plush or piled and is designed to provide the pet with a cooler feeling.

According to one particularly advantageous aspect of the invention, removable blanket 22 is designed to be releasably secured by securement structure to the outer cover 12 in either of a first orientation wherein the first side 60 of the removable blanket 22 faces the water resistant upper surface 14 of the outer cover 12 or a second orientation wherein the second side 62 of the removable blanket 22 faces the water resistant upper surface 14. In the preferred embodiment, the securement structure comprises a reversible dual zipper arrangement, which will be discussed in greater detail below.

Figure 2:
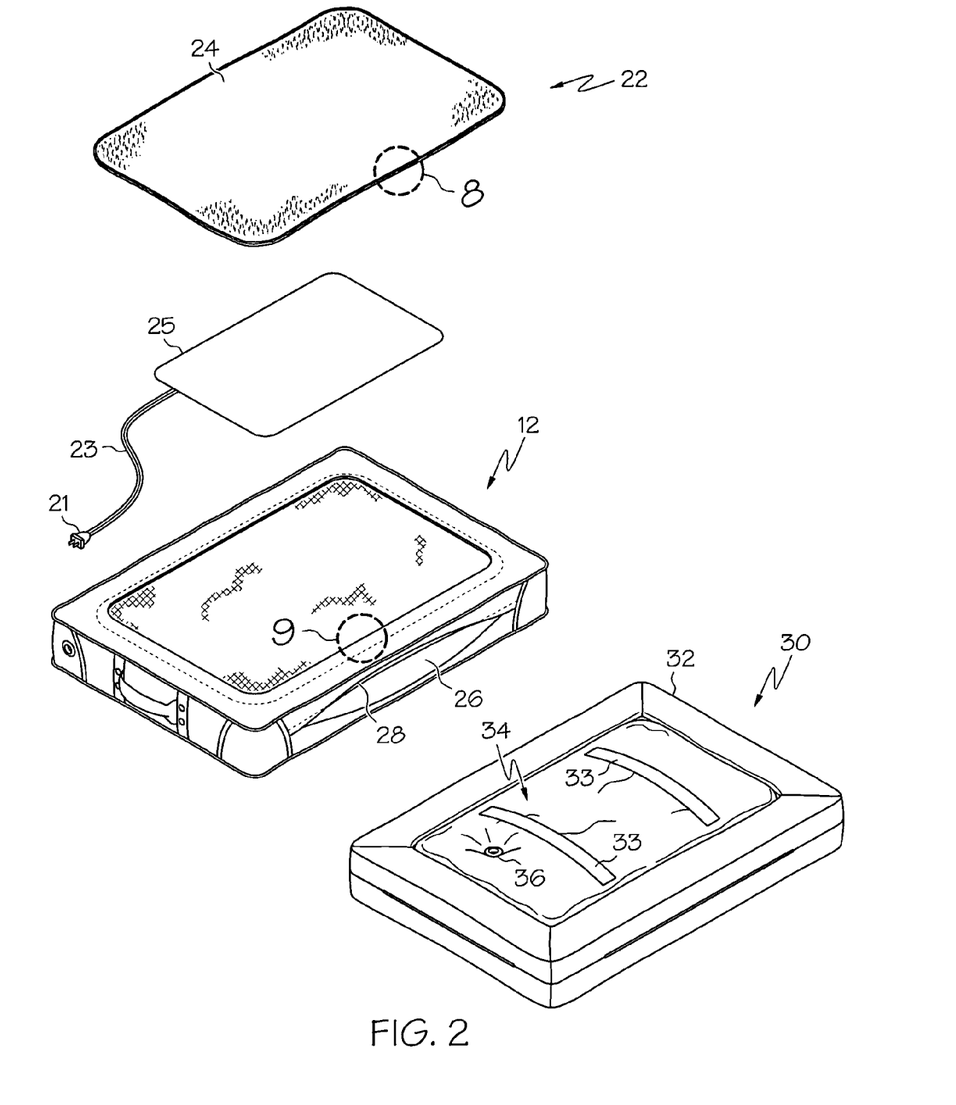
FIG. 2 is an exploded view illustrating various components of the pet bed assembly that is depicted in FIG. 1.

As is best illustrated in FIG. 2, outer cover 12 has an opening 26 defined in one side thereof for accessing the enclosed space that is defined within the outer cover 12. Opening 26 is openable and closable by a zipper arrangement 28. As may be seen in FIG. 2, pet bed assembly 10 further includes an inner bed assembly 30 having a perimeter bolster portion 32 and a central interior cushion portion 34. A power cord port 36 permits a power cord 23 for a heating pad 25 to be extended through the interior cushion portion 34 and out through the power cord opening 20 in the outer cover 12. The heating pad 25 is preferably placed between the upper surface of the interior cushion portion 34 and the outer cover 12 in order to provide warmth to a pet resting on removable blanket 22. Because upper surface 14 is at least water resistant and preferably waterproof, the heating pad will be protected against contact and penetration by fluids such as pet urine.

Figure 3:
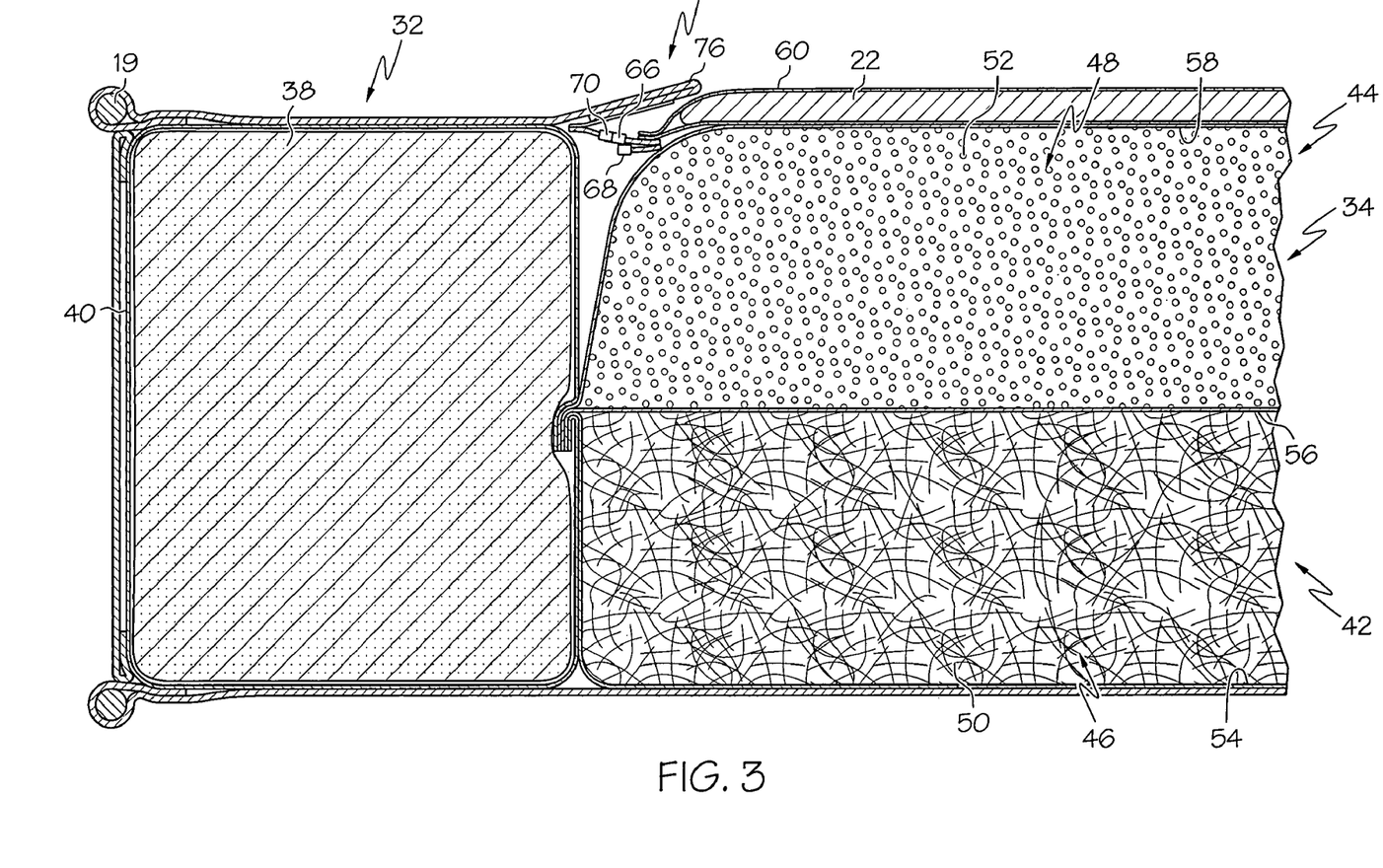
FIG. 3 is a fragmentary cross-sectional view of the pet bed assembly depicted in FIG. 1.

Looking now to FIG. 3, it will be seen that perimeter bolster portion 32 is fabricated from a central core of resiliently compressible material, which is preferably a polymeric open cell foam material, and is encased by a thin fabric cladding 40. Perimeter bolster portion 32 preferably has a rigidity that is greater than and a compressibility that is substantially less than the compressibility of the interior cushion portion. 34. Compressibility in this instance is defined as the amount of displacement that will occur upon the exertion of a compressive force that is applied along the vertical axis as viewed in FIG. 3. In other words, a given compressive force would cause substantially more vertical compression of the interior cushion portion 34 than it would the perimeter bolster portion 32. The material from which the perimeter bolster portion 32 is fabricated is therefore considered to be firmer than the material from which the interior cushion portion 34 is fabricated. The rigidity of the perimeter bolster portion 32, which extends around the perimeter of the interior cushion portion 34 also acts as a semi rigid frame that helps maintain the dimensional stability of the inner bed assembly 30.

The Polyurethane Foam Association defines firmness using the standard of indentation force deflection (IFD), defined at <http://www.pfa.org/jifsg/jifsgs4.html>. Preferably, the perimeter bolster portion 32 has a firmness that is within a IFD range of about 15 to about 40, and the interior cushion portion 34 is within an IFD range of 12 or less.

Perimeter bolster portion 32 also preferably has an average uncompressed height that is greater than an average uncompressed height of the interior cushion portion 34. The uncompressed plate of the perimeter bolster portion 32 is preferably within a range of about 3 inches to about 9 inches. The inner bed assembly together with the outer cover 12 in effect forms a resilient mattress assembly beneath the removable blanket 22. The firmness of the perimeter bolster portion 32 in conjunction with its elevation with respect to the interior cushion portion 34 creates a ledge or plateau to which the removable blanket 22 conforms on which a pet may comfortably rest its head when using the pet bed assembly 10. In addition, this perimeter elevation imparts a feeling of shelter or protection to the pet.

As FIG. 2 shows, straps 33 may be provided in order to secure the heating pad 25 in place. The interior cushion portion 34 is preferably separated into a first, lower compartment 42 and a second, upper compartment 44. A first cushioning material 46 is preferably provided within the first cushioning compartment 42 to provide static, non-changing cushioning for the pet. The first cushioning material 46 is preferably a material that is constructed and arranged to resist lateral displacement and permanent compression during normal use of the pet bed assembly. In the preferred embodiment, the first cushioning material comprises a polyester fill.

A second cushioning material 48 that possesses different cushioning characteristics than the first cushioning material 46 is provided within the second cushioning compartment 44 to provide a layer of secondary cushioning for the pet. Second cushioning material 48 is preferably a loose granular material that is constructed and arranged to facilitate lateral displacement during normal use of the pet bed assembly. In the preferred embodiment, second cushioning material 48 comprises polymeric microbeads, which are preferably fabricated from Styrofoam. Alternatively, almost any loose, granular material could be used, including natural grains such as buckwheat and millet. Because the elements forming the second cushioning material 48 are designed to be laterally displaceable during use, an effect is achieved that allows the upper layer of cushioning to conform itself to the contours of the pet's body. In the preferred embodiment, a zippered opening is provided to enable the consumer to remove or add amounts of the polymeric microbeads as desired, which will have the effect of increasing or decreasing the firmness of the second cushioning compartment 44 and the interior cushion portion 34.

According to an alternative embodiment of the invention, a similar effect could be achieved by providing a first cushioning material that has a first compressibility and a second cushioning material that has a second compressibility that is different from the first compressibility. In this embodiment, the compressibility of the second cushioning material would preferably, although not necessarily, be greater than that of the first cushioning material.

Referring again to FIG. 3, the interior cushion portion 34 preferably is fabricated from a first area of fabric 54, a second area of fabric 56 and a third area of fabric 58. The first area of fabric 54 defines the lower surface or bottom 84 of the inner bed assembly 30 and the third fabric 58 generally defines the top surface of the inner bed assembly 30. The second area of fabric 56 is secured between the first area of fabric 54 and the second area of fabric 58 and segregates the internal space defined by the fabrics 54, 58 into the first cushioning compartment 42 and the second cushioning compartment 44. The first area of fabric 54 is preferably shaped so as to give the first cushioning compartment 42 a substantially constant height across an entire width of the interior cushion portion 34. In contrast, the third fabric area 58 is shaped so that the second cushioning compartment 44 has a relatively constant height in a central portion thereof but is tapered to a reduced height in an area that is proximate to the perimeter bolster portion 32, as FIG. 3 shows. This creates a hollowed contour in the area of the removable blanket 22 that is immediately above where the interior cushion portion 34 meets the perimeter bolster portion 32 that in effect provides an opportunity for the pet to burrow in and nest at the edge of the perimeter bolster portion. It also tends to urge to laterally displaceable material in the second cushioning compartment 44 inwardly toward the center of the cushion when the pet is not on the bed, which permits the second cushioning compartment 44 to partially recover its shape after the pet removes itself from the bed.

Figure 4:
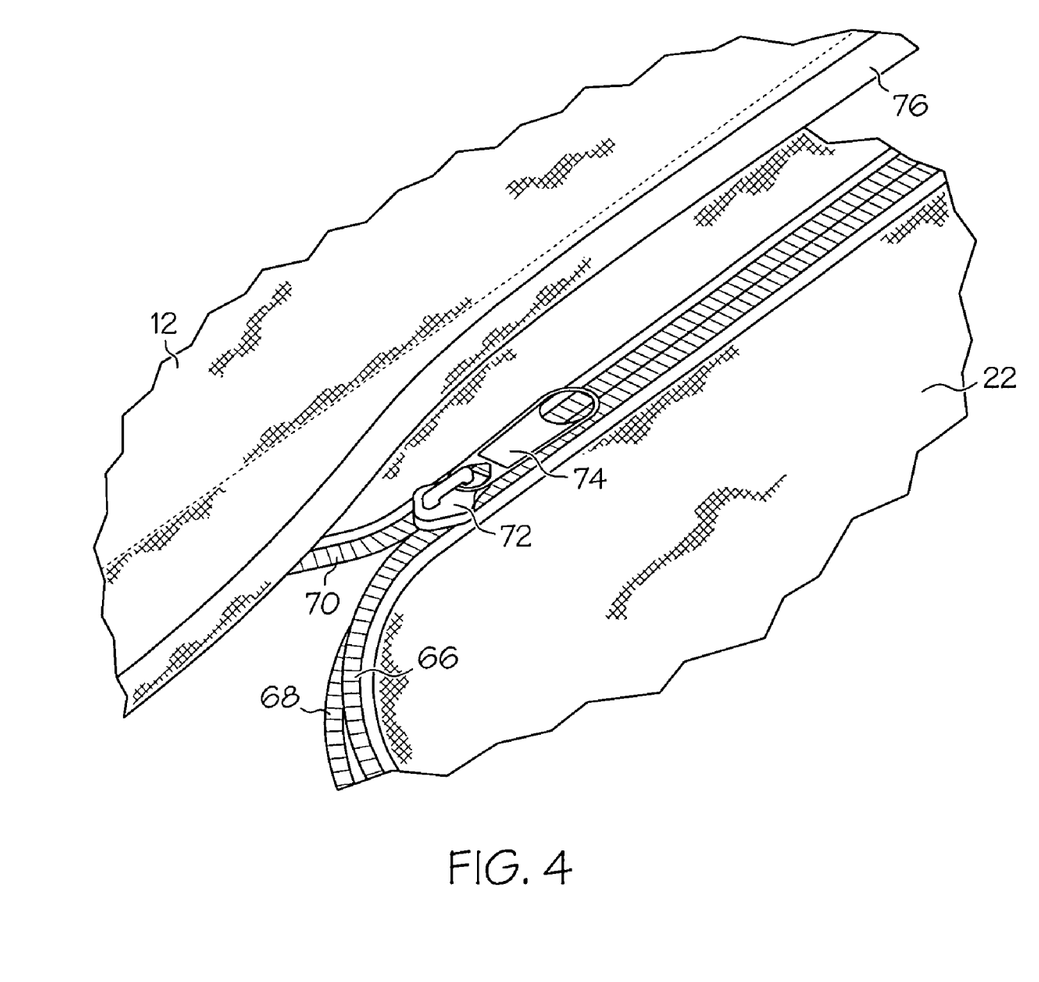
FIG. 4 is a fragmentary perspective view depicting a portion of the pet bed assembly.
Figure 8:
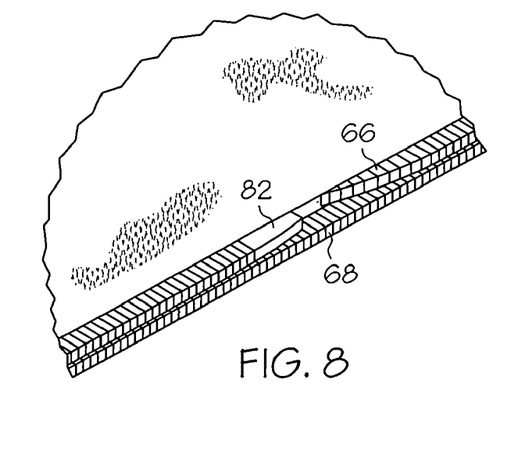
FIG. 8 is an enlarged fragmentary perspective view of the area that is indicated by the dashed circle 8 in FIG. 2.
Figure 9:
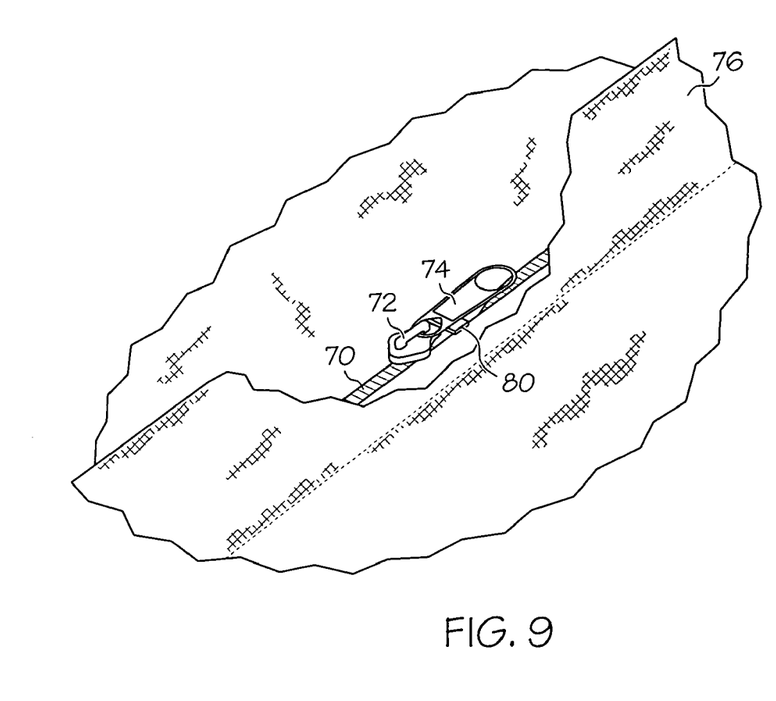
FIG. 9 is an enlarged fragmentary perspective view of the area that is indicated by the dashed circle 9 in FIG. 2.
Figure 10:
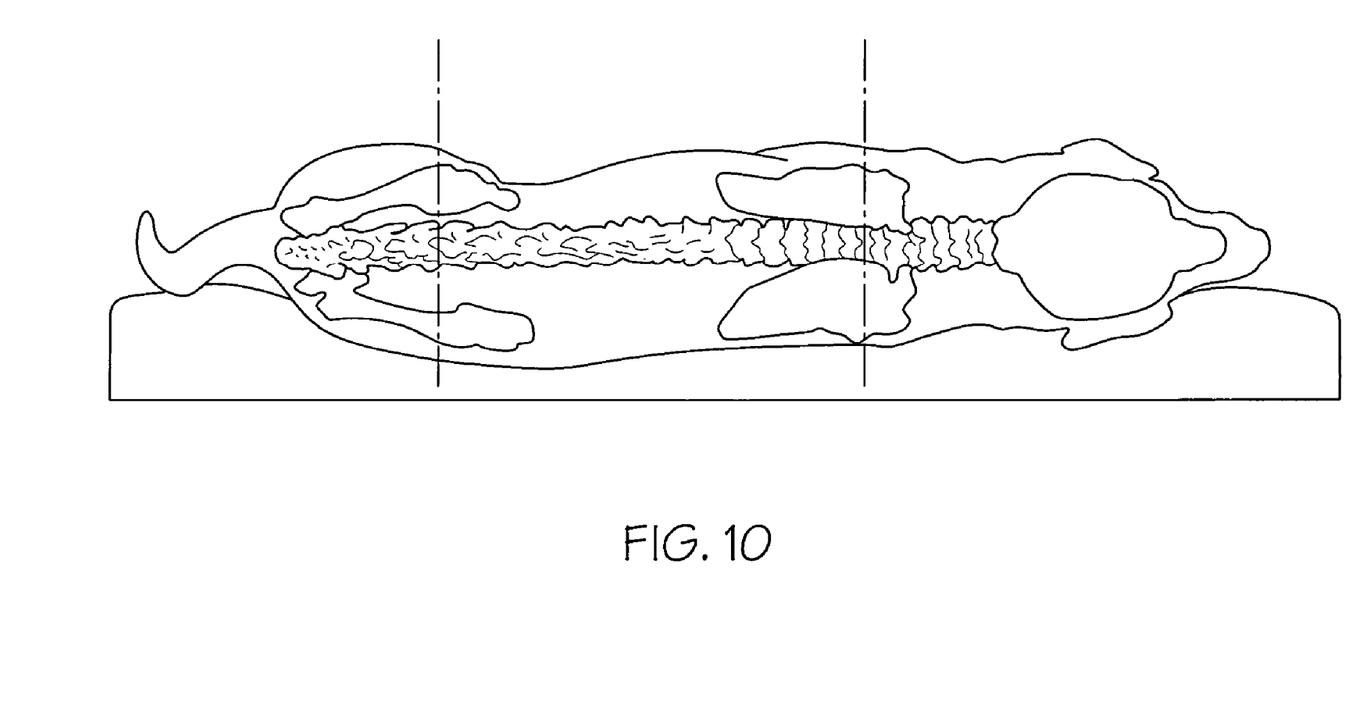
FIG. 10 is a diagrammatical view depicting the orthopedic support that a pet receives from a pet bed assembly according to the preferred embodiment.

The securement structure for releasably securing the removable blanket 22 to the outer cover 12 is preferably embodied as a reversible zipper system that includes two separate rows of zipper teeth on one of the removable blanket 22 and the resilient mattress assembly that is made up of the inner bed assembly and the outer cover 12 and a single row of zipper teeth on the other of the removable blanket and resilient mattress assembly. In the preferred embodiment, the removable blanket 22 has a first row 66 of zipper teeth at its outer periphery and a second, separate row 68 of zipper teeth immediately adjacent to the first row 66, as is best shown in FIG. 4. The outer cover 12 is provided with a single row 70 of zipper teeth arranged in the shape that is substantially congruent with the outer periphery of the removable blanket 22 and that has a zipper slider 72 with an attached pull tab 74 permanently mounted for travel thereon. A retention stop 80 as shown in FIG. 9 is provided at one end of the single row of teeth 70 in order to prevent the zipper slider 72 from disattaching from the single row of teeth 70. The first row 66 of zipper teeth on the removable blanket 22 has a lead-in area 82, as shown in FIG. 8 that is provided on a first side edge of the removable blanket 22, while the second row 68 of zipper teeth has a lead-in area on a second, opposite side edge of the removable blanket 22. The lead-in area of the first row of zipper teeth 66 is preferably positioned so as to be symmetrically opposed to the lead-in area of the second row of zipper teeth 68 about an axis of symmetry of the modular, removable blanket 22. The first row 66 of zipper teeth extends in a clockwise orientation when viewed from said first side of said blanket, and the second row of zipper teeth extends in a counterclockwise direction when viewed from the first side of said blanket. In the preferred embodiment, the outer perimeter of the removable blanket 22 is substantially rectangular, and this axis of symmetry is the major longitudinal axis of the rectangular shape. A flap 76 extends from the outer cover 12 in order to obscure view of the zipper fastener when the pet bed assembly is in normal use.

Because both rows of zipper teeth 66, 68 on the removable blanket 22 are designed to interchangeably mate with the single row 70 of zipper teeth on the outer cover 12, the first row 66 of zipper teeth is substantially the same length as and comprises zipper teeth that are substantially the same size, shape and spacing those on the second row 68 of zipper teeth.

Figure 7:
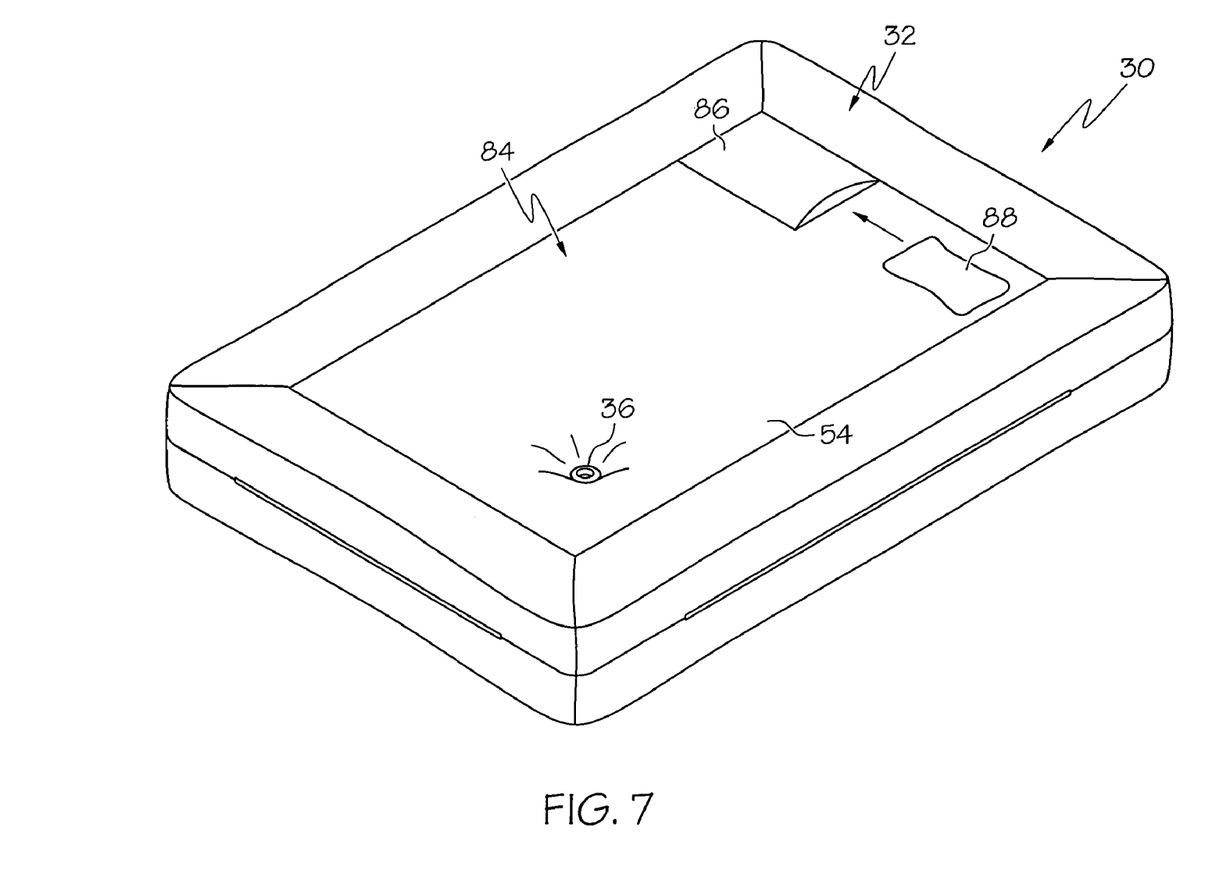
FIG. 7 is a bottom perspective view of the inner bed assembly.

According to another aspect of the preferred embodiment of the invention that is depicted in FIG. 7, a pleasant scent may be imparted to the pet bed assembly 10 by a container of scented sachet 88 that may be positioned within a small pocket 86 that is defined on the bottom 84 of the inner bed assembly 30. Preferred scents may include lavender, chamomile, vanilla and catnip.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A modular blanket unit for a pet bed assembly, comprising:
   a blanket having a first side and a second, opposite side, said blanket further having an outer perimeter;
   a first row of zipper teeth mounted to said blanket near said outer perimeter; and
   a second row of zipper teeth mounted to said blanket near said outer perimeter;
   wherein said first row of zipper teeth has a first lead-in, said second row of zipper teeth has a second lead-in, and wherein said first lead-in is positioned so as to be symmetrically opposed to said second lead-in with respect to an axis of symmetry of said modular blanket as defined by said perimeter; and
      wherein said first row of zipper teeth and said second row of zipper teeth are adapted to engage the same zipper slider; wherein when said first row of zipper teeth is engaged with said zipper slider said second row of zipper teeth is not engaged with the zipper slider.

2. A modular blanket unit for a pet bed assembly according to claim 1, wherein said outer perimeter is substantially rectangular, and wherein said axis of symmetry is a major axis of said rectangular shape.

3. A modular blanket unit for a pet bed assembly according to claim 1, wherein said first row of zipper teeth comprises zipper teeth that are substantially the same size as zipper teeth that are contained in said second row of zipper teeth.

4. A modular blanket unit for a pet bed assembly according to claim 3, wherein said first side of said removable blanket has a first texture and said second side of said removable blanket has a second texture that is different from said first texture.

5. A modular blanket unit for a pet bed assembly according to claim 4, wherein said first texture comprises a plush material for imparting a feeling of warmth to an animal.

6. A modular blanket unit for a pet bed assembly according to claim 4, wherein said second texture comprises a substantially smooth material for imparting a feeling of coolness to an animal.

7. A modular blanket unit for a pet bed assembly, comprising:

a blanket having a first side and a second, opposite side, said blanket further having an outer perimeter;

a first row of zipper teeth mounted to said blanket near said outer perimeter; and a second row of zipper teeth mounted to said blanket near said outer perimeter, and wherein said first row of zipper teeth extends in a first direction around said outer perimeter; and wherein said second row of zipper teeth extends in a second direction around said outer perimeter; and wherein said first row of zipper teeth and said second row of zipper teeth are adapted to engage the same zipper slider; wherein when said first row of zipper teeth is engaged with said zipper slider said second row of zipper teeth is not engaged with the zipper slider.

8. A modular blanket unit for a pet bed assembly according to claim 7, wherein said first row of zipper teeth comprises zipper teeth that are substantially the same size as zipper teeth that are contained in said second row of zipper teeth.

9. A modular blanket unit for a pet bed assembly according to claim 8, wherein said first side of said removable blanket has a first texture and said second side of said removable blanket has a second texture that is different from said first texture.

10. A modular blanket unit for a pet bed assembly according to claim 9, wherein said first texture comprises a plush material for imparting a feeling of warmth to an animal and wherein said second texture comprises a substantially smooth material for imparting a feeling of coolness to an animal.

11. A modular blanket unit for a pet bed assembly, comprising:

a blanket having a first side and a second, opposite side, said blanket further having an outer perimeter;

a first row of zipper teeth mounted to said blanket near said outer perimeter; and a second row of zipper teeth mounted to said blanket near said outer perimeter;

wherein said first row of zipper teeth is substantially the same length as said second row of zipper teeth; and wherein said first row of zipper teeth and said second row of zipper teeth are adapted to engage the same zipper slider; wherein when said first row of zipper teeth is engaged with said zipper slider said second row of zipper teeth is not engaged with the zipper slider.

12. A modular blanket unit for a pet bed assembly according to claim 11, wherein said first row of zipper teeth comprises zipper teeth that are substantially the same size as zipper teeth that are contained in said second row of zipper teeth.

13. A modular blanket unit for a pet bed assembly according to claim 11, wherein said first side of said removable blanket has a first texture and said second side of said removable blanket has a second texture that is different from said first texture.

14. A modular blanket unit for a pet bed assembly according to claim 13, wherein said first texture comprises a plush material for imparting a feeling of warmth to an animal.

15. A modular blanket unit for a pet bed assembly according to claim 13, wherein said second texture comprises a substantially smooth material for imparting a feeling of coolness to an animal.

* * * * *